Patented Mar. 20, 1951

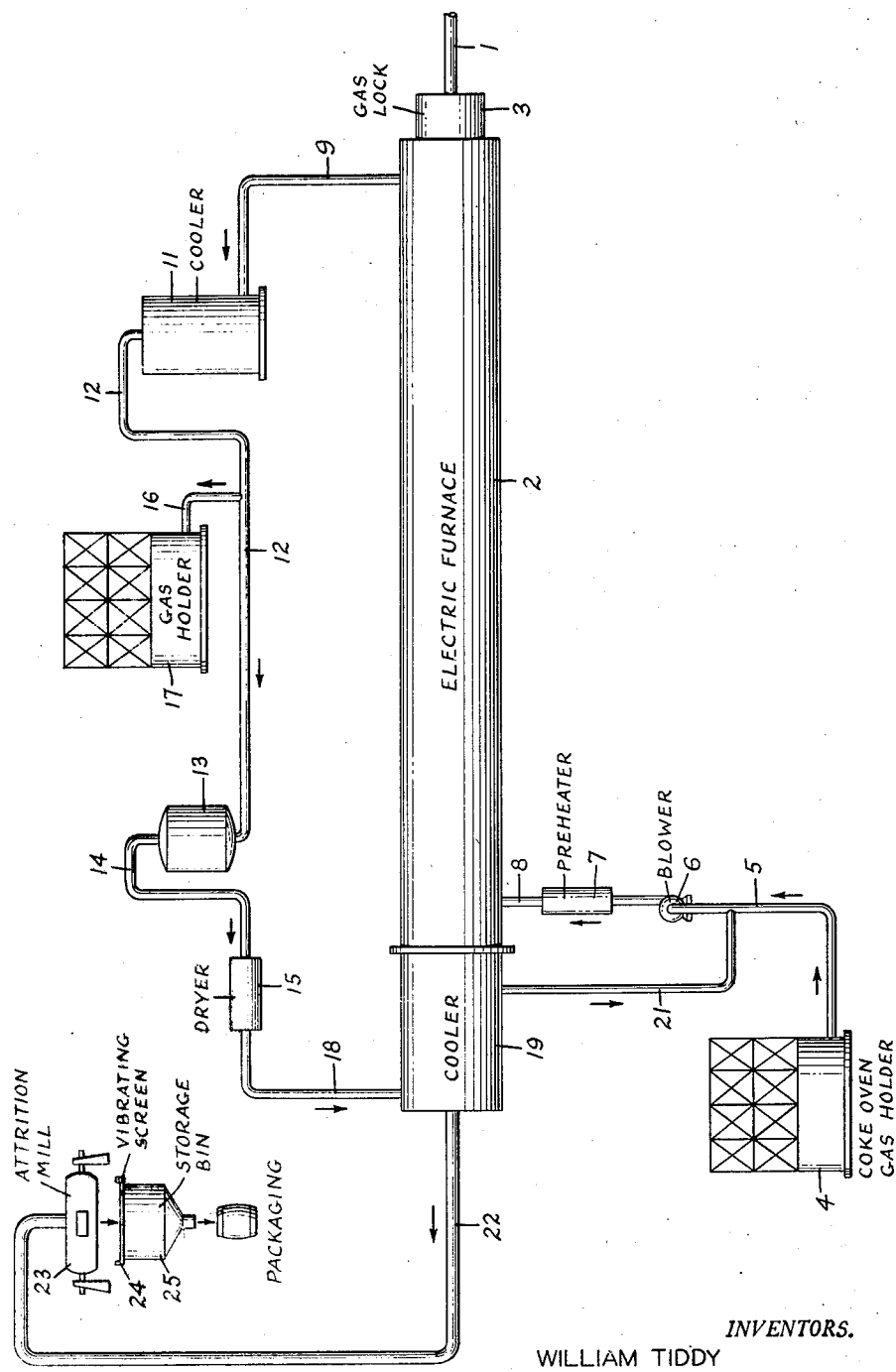

2,545,933

UNITED STATES PATENT OFFICE 2,545,933

CONVERSION OF IRON OXIDE INTO IRON WITH COKE-OVEN GAS

William Tiddy, Manhasset, N. Y., and Franklin D. Cooper, Ashland, Ky., assignors to Allied Chemical & Dye Corporation, New York, N. Y., a corporation of New York Application May 26, 1948, Serial No. 29,327

3 Claims. (Cl. 75—35)

This invention relates to the reduction of metallic compounds and more particularly refers to the gaseous reduction of iron oxides to produce powdered iron.

A conventional method of converting oxides of iron into powdered iron has been to effect such reduction by pure hydrogen or a mixture of hydrogen and nitrogen. One of the primary drawbacks involving the use of pure hydrogen is the high cost of producing this gas. Other cheaper and available reducing agents such as coke oven gas have been suggested as a medium for reducing metal oxides but to our knowledge none of these gases have been successfully utilized commercially in production of powdered iron from the oxides of iron.

A primary object of the present invention is to provide an efficient economical process for converting oxides of iron into powdered iron having a high oxygen-free iron content and a low carbon content by the utilization of coke oven gas.

Powdered iron suitable for molding must meet rigid chemical and physical specifications, which include an iron content of at least 98%, preferably 99+%, and a carbon content below 0.55%, preferably less than 0.26%. When coke oven gas is employed to reduce iron oxides to powdered iron in accordance with the methods disclosed by the prior art, an unsatisfactory iron product results, that is, a product containing less than 98% iron and usually in excess of 0.55% carbon. We have discovered that the limitations imposed on the iron product by the prior art processes may be overcome by controlling the composition of the coke oven gas with respect to its moisture and carbon dioxide content.

Coke oven gases contain an appreciable amount of hydrocarbon gases consisting primarily of methane, ethane, ethylene, propane and butane of which methane is the predominant component comprising approximately 30% of the coke oven gas and the remaining hydrocarbon gases about 3%. Pyrolytic decomposition of the hydrocarbon gases in the coke oven gas occurs at the temperatures suitable for effecting reduction of iron oxide, which temperatures are usually from 1200°–1750° F. As a result of the cracking of the hydrocarbon gases hydrogen, carbon compounds and carbon are formed, depositing on the iron oxide undergoing treatment and some forming carbides thereby producing an impure final product. While decomposition of the hydrocarbon gases is desirable from the viewpoint of providing additional hydrogen for effecting reduction of the iron oxide, most prior art methods operated at relatively low temperatures minimizing decomposition of the hydrocarbons in order to reduce the amount of carbon deposition and thereby sacrificed higher rates of reaction at the elevated temperatures and more complete utilization of the hydrogen in the coke oven gas. We have discovered that low carbon powdered iron may be obtained when operating at high temperatures by continuing the recirculation of coke oven gas in contact with iron oxide until the coke oven gas contains at least 10% carbon dioxide.

A method for effecting reduction of iron oxide to iron containing at least 99% iron and less than 0.55% carbon in accordance with the present invention comprises recirculating purified coke oven gas through or over the iron oxide at a temperature between 1700° F. and 1900° F., preferably about 1800° F., extracting moisture from the coke oven gas before each passage through or over the iron oxide, thereby reducing the moisture content of the gases to less than 20 grains, preferably less than 10 grains, per cubic foot gas measured at 60° F. and 30 inches mercury, continuously recirculating the coke oven gas until at least 50%, preferably more than 75%, by volume of its methane content has been decomposed and until the carbon dioxide in the coke oven gas has increased to at least 10%, preferably 10 to 20%, and continuing recirculation of the coke oven gas for a sufficient length of time to effect removal of 99% or more of the oxygen-oxide from the iron oxide.

The accompanying drawing is a diagrammatic flow sheet illustrating the process and apparatus of the present invention.

Iron oxide from an external source is introduced through conduit 1 into a conventional electrically heated furnace 2 provided with a gas lock 3 at its entrance end and a gas lock, not shown in the drawing, at its discharge end. The iron oxide is distributed in a thin layer, preferably not exceeding ½" depth on the bottom of furnace 2; both ends of the furnace are then closed. Purified coke oven gas from coke oven gas holder 4 passes through line 5 into blower 6 which forces the gas through preheater 7 wherein the gas temperature is elevated to approximately 1000° F. and thence through line 8 into electric furnace 2. The gases after passage through the length of electric furnace 2 in contact with the layer of iron oxide lying on the bottom of the furnace are released from the top of furnace 2 through line 9 into cooler 11 wherein the temperature of the gases is reduced to approximately 90° F. One of the purposes of cooling the coke oven gases after each passage through the furnace is to effect a more ready removal of the moisture from the gases. Cooled gases leaving cooler 11 flow through line 12 into oxide box 13 to insure complete removal of hydrogen sulfide from the gas and the purified gases then pass through line 14 into dryer 15 which may be of any conventional type for the purpose of extracting excess moisture from the gases. Decomposition of the hydrocarbon gases contained in the coke oven gases during the course of the operation causes an increase in volume of the gases circulating through the system. Excess gas thus built up in the system may be released through line 16 into gas holder 17; such gas thus released has been found eminently satisfactory for fuel purposes. Partially dried purified coke oven gas passes through line 18, cooler 19, line 21 and recirculated to electric furnace by means of blower 6. Hot reduced iron upon removal from the electric furnace 2 when exposed to the air has a tendency to become reoxidized upon contact with oxygen in the air. Therefore, cooler 19 through which cooled dry residual gases pass is provided as a means of cooling reduced iron discharging from furnace 2 prior to exposure of the iron to the atmosphere. In a batch operation such as previously described, cooler 19 may be by-passed during the reducing operation and utilized only during that portion of time when the hot reduced iron is discharged from furnace 2. In a continuous type of operation wherein iron oxide is continuously introduced into furnace 2 and powdered iron continuously withdrawn from the furnace, cool coke oven gases should preferably continuously pass in heat exchange in cooler 19 with the iron leaving furnace 2.

A temperature of between 1700° F. to 1900° F. is maintained in the electric furnace. At this temperature we have found thermal decomposition of the hydrocarbon gases in the coke oven gas proceeds rapidly to form additional hydrogen, carbon compounds and carbon. In order to efficiently utilize the hydrogen available in the coke oven gas recirculation is continued until at least 50% of the hydrocarbon gases are converted into hydrogen, carbon compounds and carbon. To eliminate carbon deposits from the iron product we have found it necessary to continue circulation of the coke oven gas until such gas contains at least 10%, preferably 10 to 20%, by volume of carbon dioxide.

To further illustrate the conditions of operation when practicing our invention, typical analyses of coke oven gases introduced at the commencement of operation and released from the system after completion of the operation are as follows:

*Analysis of coke oven gas introduced at beginning of operation*

| | Percent by volume |
|---|---|
| CO | 4.9 |
| $CO_2$ | 1.6 |
| $H_2$ | 50.1 |
| $N_2$ | 7.7 |
| $O_2$ | 0.3 |
| $CH_4$ | 31.9 |
| Illuminants | 3.5 |

*Analysis of coke oven gas at the end of operation*

| | Percent by volume |
|---|---|
| CO | 64.7 |
| $CO_2$ | 13.0 |
| $H_2$ | 16.0 |
| $N_2$ | 3.1 |
| $O_2$ | 0.1 |
| $CH_4$ | 3.0 |
| Illuminants | 0.1 |

From a comparison of the above two analyses, particularly with respect to the percent $CH_4$ and illuminants, it will be observed that the bulk of these components decompose to form additional hydrogen and carbon monoxide which serve the useful function of reducing iron oxide to iron, thereby utilizing the coke oven gas to greater advantage. Also note the increase in percent $CO_2$ in the final coke oven gas which has the effect of eliminating carbon deposition resulting from the decomposition of hydrocarbon gases.

After the iron oxide has been reduced in electric furnace 2 to an iron content of at least 98% and a carbon content of less than 0.55%, the hot iron discharging from the furnace is substantially reduced in temperature by heat exchange with cooled coke oven gases passing through cooler 19 and then passes through conduit 22 into attrition mill 23, vibrating screen 24, storage bin 25 and thence to packaging and storing. Iron particles entering the attrition mill are usually in a loosely cohesive state and the function of the attrition mill is to break up this cohesion between the particles and place the particles in their natural free-flowing condition.

The following example illustrates the present invention:

A calcined precipitate of iron oxide obtained by treating waste pickle liquor containing ferrous sulfate with ammonia and air is distributed in a ½ inch thick layer on the bottom of a horizontal electric furnace closed at both ends. Coke oven gas of the following composition is recirculated at the rate of 4.6 cubic feet per hour per pound iron oxide through and over the iron oxide in the furnace maintained at a temperature of 1760° F.

*Composition of coke oven gas*

| | Percent |
|---|---|
| Carbon monoxide | 4.9 |
| Carbon dioxide | 1.6 |
| Hydrogen | 50.1 |
| Nitrogen | 7.7 |
| Oxygen | 0.3 |
| Methane | 31.9 |
| Illuminants | 3.5 |

Prior to each passage of the coke oven gas in contact with the iron oxide, the gas is cooled and dried with activated alumina to a moisture content of about 8 grains per cubic foot of gas when measured at 60° F. and 30 inches of mercury. Samples are periodically withdrawn from the stream of recirculating coke oven gas to determine its chemical composition. At the end of the operation the spent coke oven gases contain 12.7% $CO_2$, 64.3% CO and 19.2% hydrogen by volume. The carbon and FeO content in the final iron product are 0.15% and 0.38% by weight, respectively.

For the purpose of illustrating the results obtained with incomplete conversion of the coke oven gas an operation is carried out in a manner identical with Example 1 with the exception that recirculation of the coke oven gas is terminated when the residual coke oven gas contains 5.8% $CO_2$, 61.0% CO and 29.8% hydrogen. As a consequence of the low carbon dioxide content in the coke oven gas, the final iron product has 0.45% carbon and 0.14% FeO. The importance of maintaining at least 10% carbon dioxide in the residual coke oven gas is demonstrated by the appreciably higher carbon content of the iron product.

In another comparative test for the purpose of showing the effect of moisture in the coke oven gas with respect to the FeO content in the final iron product, the operation is conducted in a manner similar to Example 1 with the exception that no attempt is made to extract moisture from the coke oven gases prior to their passage in contact with iron oxide. The final iron product contains 2.02% FeO and .19% carbon.

Since certain changes may be made without departing from the scope of the invention, it is intended that the above shall be interpreted as illustrative and not in a limiting sense.

We claim:

1. A process for the conversion of oxides of iron into oxygen-free iron which comprises recirculating purified coke oven gas in contact with iron oxide at a temperature between 1700° F. and 1900° F., extracting moisture from the coke oven gas before each passage of the coke oven gas in contact with the iron oxide, continuing the recirculation of the coke oven gas until at least 50% of the methane in the coke oven gas is decomposed and until the coke oven gas contains at least 10% carbon dioxide thereby effecting removal of more than 99% of the oxide-oxygen and producing an iron product containing less than 0.26% carbon.

2. A process for the conversion of oxides of iron into oxygen-free iron which comprises recirculating purified coke oven gas in contact with iron oxide at a temperature between 1700° F. and 1900° F., reducing the moisture content in the coke oven gas before each passage in contact with the iron oxide to an amount not to exceed 20 grains water per cubic foot gas measured at 60° F. and 30 inches mercury, continuing the recirculation of the coke oven gas until at least 50% of the methane in the coke oven gas is decomposed and until the coke oven gas contains at least 10% carbon dioxide thereby effecting removal of about 99% of the oxide-oxygen and producing an iron product containing less than 0.26% carbon.

3. A process for the conversion of oxides of iron into free iron which comprises recirculating purified coke oven gas in contact with iron oxide at a temperature between 1700° F. and 1900° F., reducing the moisture content in the coke oven gas before each passage in contact with the iron oxide to an amount not to exceed 10 grains per cubic foot gas measured at 60° F. and 30 inches mercury, and continuing the recirculation of the coke oven gas until at least 75% of the methane in the coke oven gas is decomposed and until the coke oven gas contains between 10% and 20% carbon dioxide thereby effecting removal of more than 99% of the oxide-oxygen and producing an iron product containing less than 0.26% carbon.

WILLIAM TIDDY.
FRANKLIN D. COOPER.

REFERENCES CITED

The following references are of record in the file of this patent:

UNITED STATES PATENTS

| Number | Name | Date |
|---|---|---|
| 1,555,312 | Parsons | Sept. 29, 1925 |
| 1,603,710 | Parsons | Oct. 19, 1926 |
| 1,758,786 | Ekelund | May 13, 1930 |
| 2,048,112 | Gahl | July 21, 1936 |
| 2,057,554 | Bradley | Oct. 13, 1936 |
| 2,142,100 | Avery | Jan. 3, 1939 |
| 2,166,207 | Clark | July 18, 1939 |
| 2,170,158 | Rennerfelt | Aug. 22, 1939 |
| 2,201,181 | Kalling | May 21, 1940 |
| 2,287,651 | Turin | June 23, 1942 |
| 2,329,862 | Terry | Sept. 21, 1943 |
| 2,379,423 | Cape et al. | July 3, 1945 |

FOREIGN PATENTS

| Number | Country | Date |
|---|---|---|
| 199,354 | Great Britain | Not accepted, 1923 |

OTHER REFERENCES

"The Reduction of Iron Oxides by Fuel Gases" by E. D. Eastman, U. S. Bureau of Mines, Report of Investigations 2485, June 1923.

"Reduction of Iron Ores etc.," A. I. M. E. Transactions (1940), vol. 140, page 118.

"Low Temperature Gaseous Reduction etc.," A. I. M. E. Transactions (1946), vol. 167, pages 237–280.

"Controlled Atmospheres in the Heat Treatment of Metals" by Ivor Jenkins (1946), pages 287 and 289.